Patented Jan. 2, 1923.

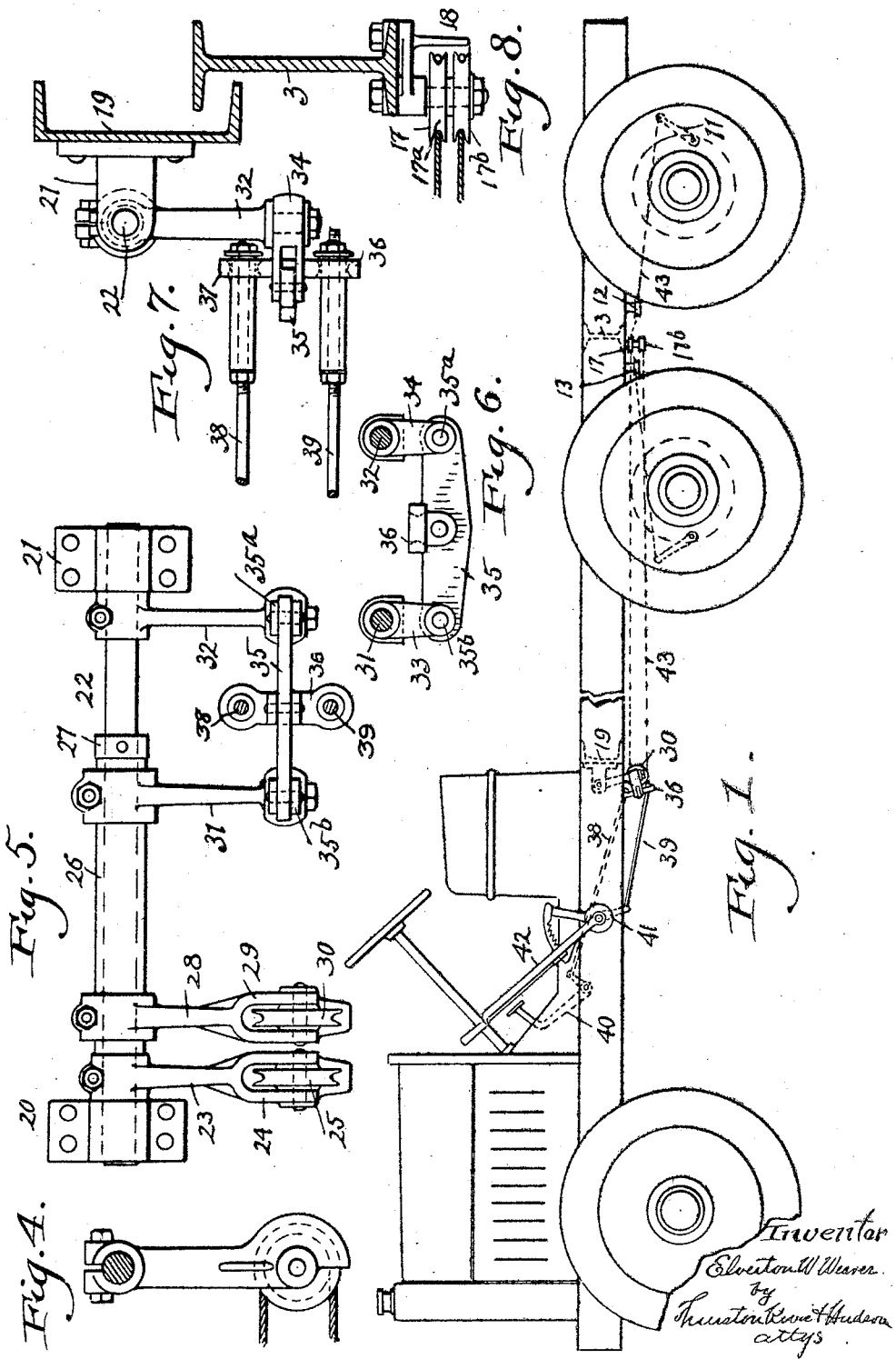

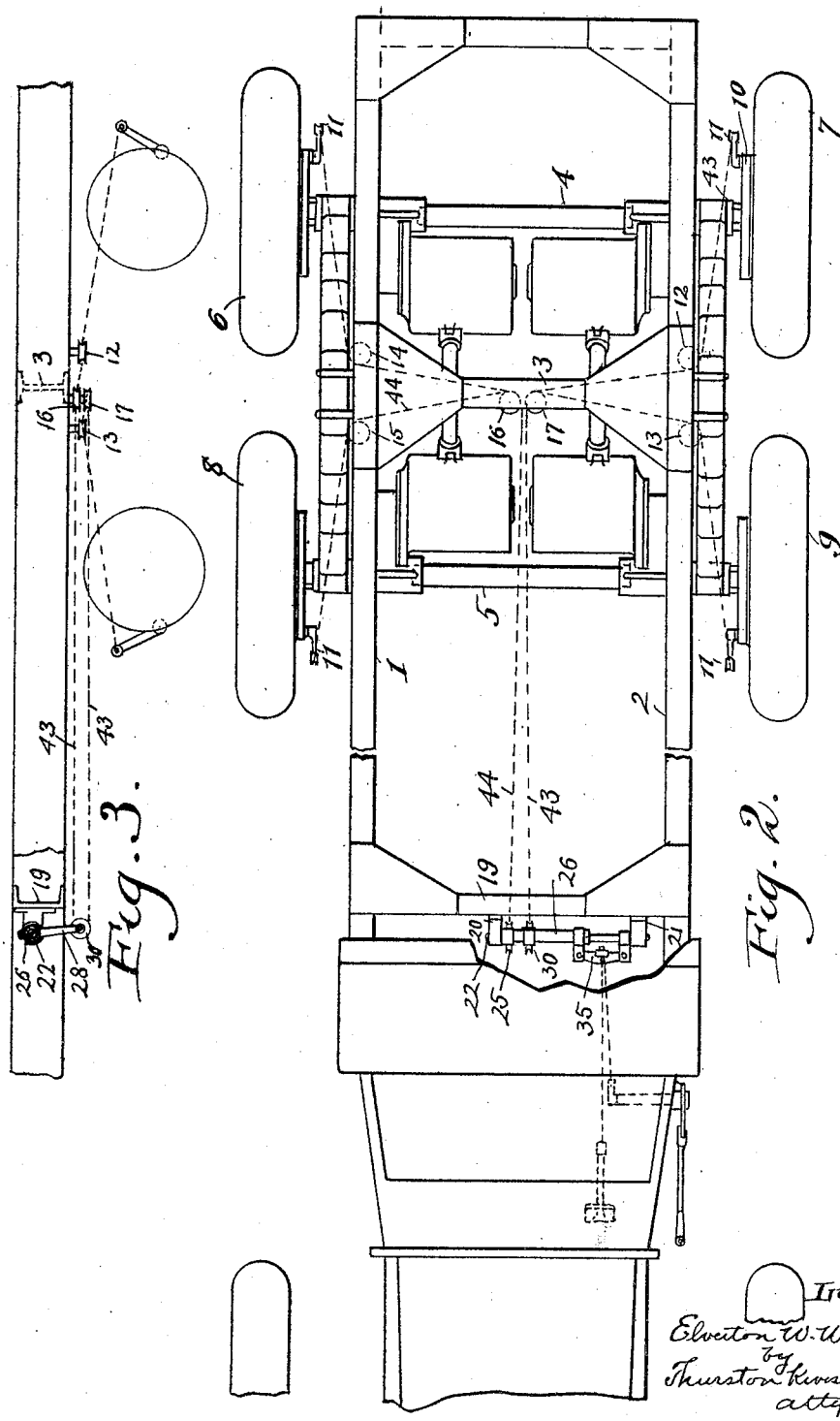

1,440,514

UNITED STATES PATENT OFFICE.

ELVERTON W. WEAVER, OF CLEVELAND, OHIO.

BRAKE-OPERATING MECHANISM.

Application filed November 29, 1920. Serial No. 427,143.

*To all whom it may concern:*

Be it known that I, ELVERTON W. WEAVER, a citizen of the United States, residing at Cleveland, in the county of Cuyahoga and State of Ohio, have invented a certain new and useful Improvement in Brake-Operating Mechanism, of which the following is a full, clear, and exact description.

The present invention relates to mechanism by which the brakes upon a vehicle may be operated.

One of the objects of the invention is the provision of mechanism whereby the force applied at the brakes for setting the same will be equalized, thus insuring equal application of all the brake bands.

A further object of the invention is the provision of mechanism applicable to vehicles having more than two wheels, which are equipped with brake devices.

A further object of the invention is the provision of providing flexible cables by which the movable parts of the brake mechanisms are operated.

Reference should be had to the accompanying drawings forming a part of this specification in which Fig. 1 is a side elevation of a chassis equipped with the present invention; Fig. 2 is a top plan view of the showing in Fig. 1; Fig. 3 is a side elevation of a portion of the construction shown in Fig. 2; Fig. 4 is an end elevation of the construction shown in Fig. 5, and Fig. 5 is a front elevation of a portion of the brake mechanism; Fig. 6 is a top plan view with portions in section of an equalizing bar and associated parts; Fig. 7 is an end elevation of the structure shown in Fig. 5; Fig. 8 is a side elevation of a portion of the brake operating mechanism.

The application of the invention is shown in the drawings and will be described with respect to its application to a vehicle in which the rear end of the chassis is supported upon four wheels, with brake mechanism associated with each of the wheels. This, however, not to be considered as at all limiting with respect to the application of the invention for as will be readily seen, the invention may be applied to vehicles having two wheels provided with brake mechanism or vehicles which have more than two wheels.

Referring to the drawing, 1 and 2 indicate the side members of a chassis. Extending transversely of the chassis is a beam 3 which at its opposite ends is secured to the two side members of the chassis.

Axles are indicated at 4 and 5 at the outer end of which axles are mounted wheels 6, 7, 8 and 9 respectively. Each of the wheels is provided with brake mechanism which is generally indicated at 10 with respect to wheel No. 7 and it will be understood that this brake mechanism is not more fully shown because the same may be any approved type of brake mechanism and the particular construction of the same has no particular bearing on the invention in hand. All of such braking mechanism will employ some lever such as indicated at 11 by which the brake band is operated. So far as this invention is concerned all that need be considered with respect to the brake mechanism itself is the lever 11 or equivalent member on any particular type of brake mechanism. Mounted on the chassis adjacent the wheel 10 is a pulley 12 and there is also a similar pulley 13 mounted on the side member 2 of the chassis which is adjacent the wheel 9.

Similarly there are pulleys 14 and 15 which are mounted on the side member 1 of the chassis adjacent the wheels 6 and 8 respectively.

Mounted on the underside of the beam 3 are double pulleys which are indicated at 16 and 17 respectively.

Fig. 3 shows in elevation one of these sets of pulleys which we may assume to be the set of pulleys indicated at 16 and it will be seen that this center pulley 17 is made up of two pulleys $17^a$ and $17^b$ which are independently mounted upon a pin or short shaft 18 with suitable means for retaining the pulleys upon the shaft.

Adjacent the forward end of the chassis there is a transversely extending member 19 which is provided with brackets such as indicated at 20 and 21 and in these brackets there is journaled the opposite ends of a shaft 22. Referring to Fig. 5 it will be seen that there is mounted upon the shaft 22 an arm 23 which arm is definitely secured to the shaft 22 in such a manner that the shaft and arm move together. This arm at its lower end is bifurcated as indicated at 24, and receives a pulley 25.

Surrounding the shaft 22 is a sleeve 26, one end of which sleeve bears against the hub of the arm 23 and the opposite end of the sleeve bears against a collar 27 which is fixed to the shaft. The sleeve 26 is not secured to the shaft 22 but is free to rotate thereon. At one end of the sleeve 26 there is secured an arm 28 which is definitely secured to the sleeve in such a manner that it moves when the sleeve rotates. This arm at its lower end is bifurcated as indicated at 29 and receives a pulley shown at 30. The arm 28 which is just described is located at that end of the sleeve which is toward the arm 23 so that the arms 23 and 28 are adjacent each other.

Adjacent the opposite end of the sleeve 26 to that which has just been described is a depending arm 31. This arm is secured to the sleeve 26 so that as the arm 31 is moved the sleeve 26 will be rotated.

Secured to the shaft 22 adjacent the bracket 21 is a depending arm 32 which is definitely secured to the shaft 22 so as to move therewith.

At the lower end of each of the levers 31 and 32 an outwardly extending lever is mounted such as indicated at 33 and 34 respectively.

Each of these levers 33 and 34 is recessed at its end to receive the opposite ends of an equalizing bar or yoke 35 and the yoke is secured to the levers 33 and 34 by means of pins such as indicated at $35^a$ and $35^b$. This construction enables relative movement about the pins $35^a$ and $35^b$ between the yoke 35 and the arms 33 and 34. Secured to the yoke at substantially the central portion thereof is a transversely extending member 36. This member 36 is at its opposite ends provided with openings and each opening is adapted to receive a rod or cable, one of which is indicated at 38 and the other at 39. These respective members 38 and 39 may be secured to the member 36 in any desired manner. The member 38 is pivotally secured to the arm of a foot lever indicated at 40, while the member 39 is secured to an arm 41 which is in turn operatively connected with a hand lever 42 which is a lever of usual construction such as employed for operating brakes of a vehicle by hand.

It will be seen that from the foregoing construction that the member 36 is moved either when the foot lever 40 is operated or when the hand lever 42 is operated, and furthermore, these instrumentalities may be independently operated to accomplish the brake operating function. Operation of either of the devices 40 or 42 will move the yoke 30 in a forward direction thus causing simultaneous rotation of the shaft 22 and the sleeve 26 which in turn imparts movement to the arms 23 and 28.

Secured to the lever 11 of the brake operating mechanism associated with the wheel 7 is a cable 43. This cable cooperates with the pulley 12 and with one of the pulleys comprising the set of pulleys 16, as for instance the pulley $16^b$. The cable extends forward and cooperates with the pulley 30 carried by the arm 28 and returns in a rearward direction, passing around the pulley $16^a$, thence into engagement with the pulley 17 and is secured at its free end to the lever 11 of the brake mechanism associated with the wheel 9. Similarly the cable 44 has one end thereof associated with the lever 11 of the brake mechanism associated with the wheel 8, passes around one of the pulleys of the set 16, thence forwardly and around the pulley 25, thence rearwardly and around the other of the set of pulleys comprising the set 16, thence to the pulley 14 and the free end is secured to the arm 11 of the brake mechanism associated with the wheel 6.

It will thus be seen that when either the foot lever 40 or the hand lever 42 is operated so as to pull the equalizing yoke 35 forward and thus move the arms 23 and 28 in a forward direction, tension is placed on the cables 43 and 44, which in turn causes the movement of the various arms 11 to set the brake bands of the respective brake mechanisms. Due to the fact that the cable 44 passes around the pulley 25 and the cable 43 passes around the pulley 30, the pull on each cable is perfectly equalized because the pulley in each instance is free to rotate so as to effect an equalized pull on each of the respective cables.

Moreover inasmuch as the force for causing the braking action is applied to the equalizing bar 35, and the equalizing bar is capable of movement with respect to the arms 31 and 32 with which it is connected it will be clear that either the shaft 22 or the sleeve 26 may move relative to each other so as to apply equal force to the cables 43 and 44, thus insuring that each of the arms 23 and 28 will be moved a sufficient distance and in turn cause the cables 43 and 44 to move a sufficient distance so that the brakes at each of the wheels will be set in equal degree and with equal force.

The particular arrangements of the cables with respect to the pulleys with which they cooperate is not the only arrangement which can be effected. Other cable arrangements may be used without departing from the described invention.

Having described my invention, I claim:

1. The combination of a plurality of brake mechanisms, a plurality of cables for operating said brake mechanisms, an equalizing device, said equalizing device including a pair of pulleys, one of said cables passing around each of the said pulleys whereby when the equalizing device is operated, the pull on the cables causes equal force to be applied to each brake mechanism.

2. The combination of a plurality of brake mechanisms, a plurality of cables for operating said brake mechanisms, an equalizing device, a plurality of pivotally mounted pulleys carried by said device, one of said cables passing around each of said pulleys, and means for moving said pivots which means permits relative pivotal movement of the pulleys, thereby equalizing the pull on the cables to cause equal application of force to each braking mechanism.

3. The combination of a plurality of four brake mechanisms, a pair of cables, an end of each cable being connected with an operating part of one of said brake mechanisms, an equalizing device, pivoted members carried by said equalizing device, one of the cables cooperating with each of the pivoted members, means for moving the said pivoted members about their pivots, which means permits relative movement of the pivoted members, whereby the pull on the cables causes equal force to be applied to each brake mechanism.

4. The combination of four brake mechanisms, a pair of cables, each end of the cables being secured to an operating part of one of the brake mechanisms, an equalizing device, a pair of pivoted pulleys carried by said device, each cable passing over one of said pulleys, means for moving each of said pulleys about its pivot, and a device flexibly connected with each of the last mentioned means, and a device for exerting pulling force upon said connecting means.

5. The combination of four brake mechanisms, a pair of cables for operating said brake mechanisms, an end of each cable being connected with one of the brake mechanisms, a shaft mounted for oscillation, an arm secured to said shaft, a pulley carried by said arm, one of the said cables passing around the said pulley, a sleeve carried by said shaft and free to turn thereon, an arm carried by said sleeve, a pulley carried by the said arm, the other of said cables passing around the last mentioned pulley, means for turning the shaft, means for turning the sleeve, a bar member flexibly connecting with the means for operating the shaft and the sleeve, and a device for applying a pulling force to the said bar.

6. The combination with a chassis, a plurality of wheels associated with the chassis, a brake mechanism associated with each wheel, a cable, each end of said cable being connected with an operating part of one of said brake mechanisms, a member extending transversely between the side members of the chassis, pulleys carried by said transverse member, the said cable passing around said pulleys, a pivotally mounted pulley adjacent the forward end of the chassis, the said cable extending around the said pulley and means for moving the said pulley about its pivot whereby when the pulley is moving about its pivot the pull on the cable causes equal force to be applied to each brake mechanism.

7. The combination with a chassis, a plurality of wheels associated with the chassis, a brake mechanism associated with each wheel, a cable, each end of said cable being connected with an operating part of one of said brake mechanisms, a member extending transversely between the side members of the chassis, pulleys carried by said transverse member, the said cable passing around said pulleys, an equalizing device mounted adjacent the forward end of the chassis, said device comprising a pivoted pulley around which pulley the said cable passes and a plurality of operating devices connected with said equalizing device whereby the same is operated by either of said devices independently.

8. The combination of a chassis, four wheels upon which said chassis is mounted, a brake mechanism associated with each wheel, a pair of cables, each cable having its ends connected with one of the brake mechanisms, a member extending transversely of the chassis, pulleys mounted upon said transverse member and around which the cables pass, an equalizing device mounted upon the chassis at the forward portion thereof, said equalizing device comprising a pair of pulleys which are pivotally mounted, one of said cables passing around each of said pulleys, means for moving each of said pulleys about its pivot and a plurality of operating devices connected with said means which may independently operate the said means.

In testimony whereof, I hereunto affix my signature.

ELVERTON W. WEAVER.